US012704746B2

(12) United States Patent
Jiang

(10) Patent No.: US 12,704,746 B2
(45) Date of Patent: Aug. 11, 2026

(54) OPHTHALMIC LENS AND OPHTHALMIC LENS TREATMENT METHOD

(71) Applicant: ESSILOR INTERNATIONAL, Charenton-le-pont (FR)

(72) Inventor: Peiqi Jiang, Dallas, TX (US)

(73) Assignee: Essilor International, Charenton-le-pont (FR)

( * ) Notice: Subject to any disclaimer, the term of this patent is extended or adjusted under 35 U.S.C. 154(b) by 701 days.

(21) Appl. No.: 17/911,057

(22) PCT Filed: Mar. 12, 2021

(86) PCT No.: PCT/EP2021/056311
§ 371 (c)(1),
(2) Date: Sep. 12, 2022

(87) PCT Pub. No.: WO2021/180912
PCT Pub. Date: Sep. 16, 2021

(65) Prior Publication Data

US 2023/0113381 A1 Apr. 13, 2023

(30) Foreign Application Priority Data

Mar. 13, 2020 (EP) .................................... 20305266

(51) Int. Cl.
*G02C 7/02* (2006.01)
*B29D 11/00* (2006.01)

(52) U.S. Cl.
CPC ........ *G02C 7/024* (2013.01); *B29D 11/00432* (2013.01); *B29D 11/0073* (2013.01)

(58) Field of Classification Search
CPC .......... B29D 11/00432; B29D 11/0073; G02C 7/024
See application file for complete search history.

(56) References Cited

U.S. PATENT DOCUMENTS 4,816,342 A 3/1989 Farrell et al.
9,283,717 B2 3/2016 Jiang et al.
10,386,654 B2 * 8/2019 Marshall ................. G02C 7/06
(Continued)

FOREIGN PATENT DOCUMENTS

WO WO 2011/075112 6/2011

OTHER PUBLICATIONS

International Search Report and Written Opinion issued in Corresponding PCT application No. PCT/EP2021/056311, dated Jun. 10, 2021.

*Primary Examiner* — Mathieu D Vargot
(74) *Attorney, Agent, or Firm* — Norton Rose Fulbright US LLP

(57) ABSTRACT

The present disclosure relates to an ophthalmic lens treatment method, comprising heating, in a humidified environment, a semi-finished lens (20) to a predetermined temperature, the semi-finished lens (20) containing a base lens (10) and a film structure (2) of a predetermined thickness, and surfacing the semi-finished lens (20) to a predetermined power, wherein the predetermined temperature is a temperature above a softening temperature of the film structure (2), the humidity of the humidified environment is between 30% and 99% and the predetermined thickness of the film structure (2) is between 200 μm and 800 μm.

15 Claims, 10 Drawing Sheets

(56) References Cited

U.S. PATENT DOCUMENTS

| | | | | |
|---|---|---|---|---|
| 2004/0220333 | A1* | 11/2004 | Tadros .................... | B32B 27/06 525/418 |
| 2005/0190463 | A1 | 9/2005 | Kojima | |
| 2013/0208239 | A1 | 8/2013 | Jiang et al. | |
| 2013/0255860 | A1 | 10/2013 | Jiang et al. | |

* cited by examiner

OPHTHALMIC LENS AND OPHTHALMIC LENS TREATMENT METHOD

CROSS-REFERENCE TO RELATED APPLICATIONS

This application is a national phase application under 35 U.S.C. § 371 of International Application No. PCT/EP2021/056311 filed 12 Mar. 2021, which claims priority to European Patent Application No. 20305266.7 filed 13 Mar. 2020. The entire contents of each of the above-referenced disclosures is specifically incorporated by reference herein without disclaimer.

BACKGROUND

Field of the Disclosure

The present disclosure relates to an ophthalmic lens treatment method for ophthalmic lenses implemented within ophthalmic devices and other ophthalmic lens applications.

Description of the Related Art

Ophthalmic lenses are typically comprised of a base lens and a film which is laminated on an optical surface of the base lens. At baseline, the film has two parallel external surfaces. The optical diopter function of the ophthalmic lens, however, depends on the shape of the optical surface of the base lens which supports the film. As a consequence, any change in the shape of the base lens optical surface with respect to a target surface, as may occur during surfacing, results in optical defects such as image distortions or optical aberrations due to internal stresses in the film. Such distortions and aberrations are most significant in a center zone of the lens and may lead to discarding of the final product following surfacing.

Such distortions and aberrations occur, in part, because the film is adhered to the base lens, wherein the adhered, optical surface of the base lens may be altered. During surfacing, the film may relax and/or deform and can this relaxation and/or deformation can be significant enough to affect the optics of the resulting ophthalmic lens. In other words, because the film is adhered to the base lens, the adhered surface of the base lens may be altered. Resulting image distortions and/or optical aberrations may appear in the ophthalmic lens. It can be appreciated that such image distortions and/or optical aberrations are more pronounced with thinner base lenses and higher prescription, or higher power, base lenses. For instance, optical defects may arise during the surfacing of the base lens to a power of −8.00D with a center base lens thickness of 1.30 mm.

In an effort to account for these optical defects, especially for high power base lenses, several approaches have been considered. For instance, a thin film (<200 μm) may be used in an effort to reduce residual stresses within the film. This approach, though providing a thin and light ophthalmic lens, eliminates the benefits of a thick film in processing and/or ophthalmic applications. In other words, these approaches fail to efficiently solve for the residual stresses of the film of the ophthalmic lens during surfacing. Accordingly, the present disclosure provides a suitable ophthalmic lens treatment method.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The present disclosure relates to a lens and lens treatment method.

According to an embodiment, the present disclosure further relates to an ophthalmic lens treatment method, comprising heating, in a humidified environment, a semi-finished lens to a predetermined temperature, the semi-finished lens containing a base lens and film structure of a predetermined thickness, and surfacing the semi-finished lens to a predetermined power, wherein the predetermined temperature is a temperature above a softening temperature of the film structure, the humidity of the humidified environment is between 30% and 99%, and the thickness of the film structure is between 200 μm and 800 μm.

According to an embodiment, the present disclosure further relates to an ophthalmic lens, comprising an annealed semi-finished lens including a base lens and film structure of a predetermined thickness of at least 200 μm, the annealed semi-finished lens being annealed in a humidified environment at a predetermined temperature above a softening temperature of the film structure, wherein the annealed semi-finished lens is surfaced to a predetermined power, the humidified environment has a humidity of between 30% and 99%, the base lens is at least one of a material selected from the group consisting of polycarbonate, polymethyl methacrylate, polyamide, polyester, cellulose acetate butyrate, and triacetyl cellulose, and the base lens or the film structure has properties including at least one selected from the group consisting of an ultraviolet cut filter, a blue light cut filter, an infrared cut filter, a selective wavelength cut dye, a color enhancement dye, a light filter dye, a light polarization filter dye, photochromic properties, and electrochromic properties.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
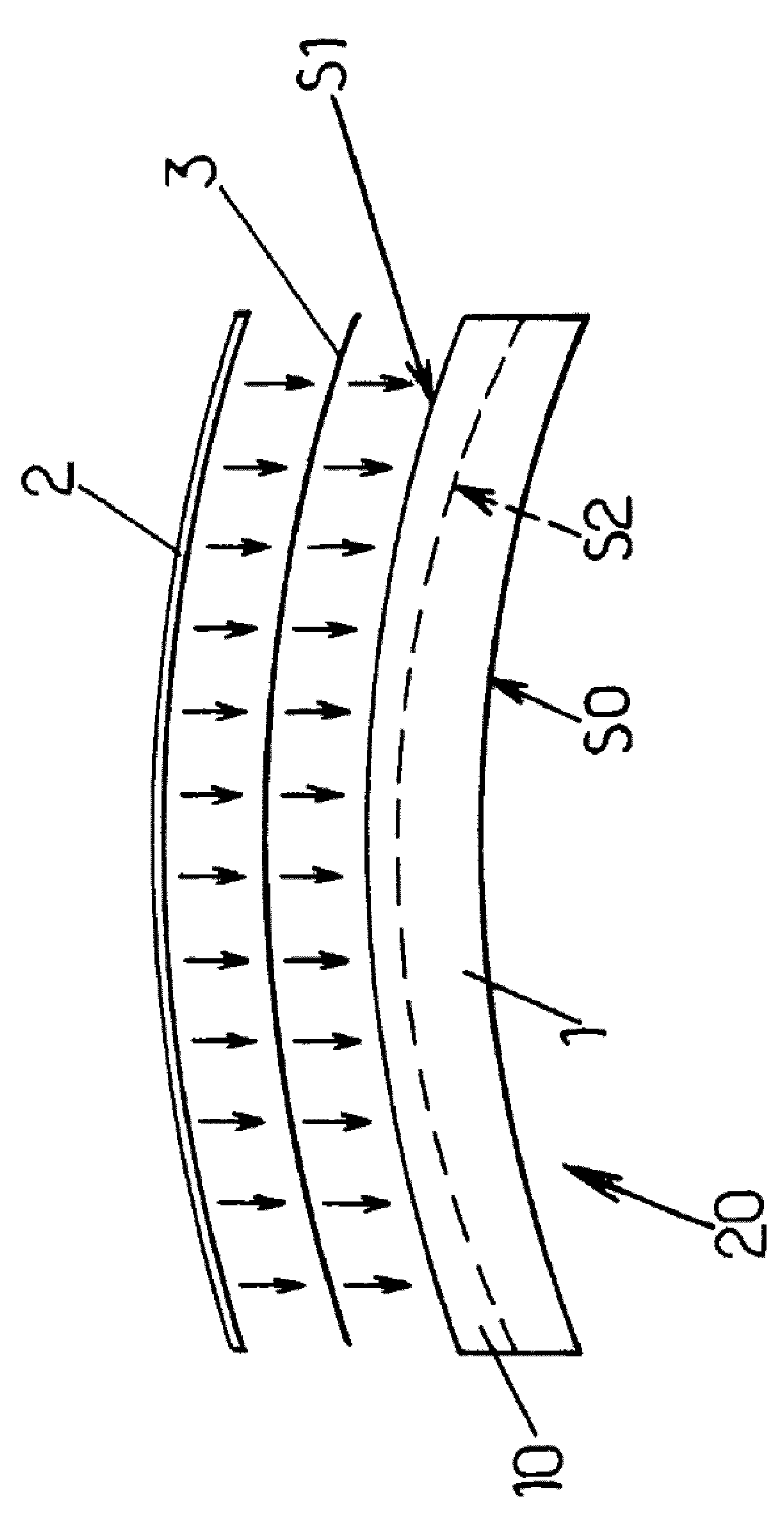
FIG. 1A is an illustration of an ophthalmic lens structure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The terms "about" and "approximately" are defined as being close to as understood by one of ordinary skill in the art. In one non-limiting embodiment the terms are defined to be within 10%, preferably, within 5%, more preferably, within 1%, and most preferably, within 0.5%.

The terms "laminate" and "laminated lens" or variations of these terms, when used in the claims and/or the specification, refer to a similar structure.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The process of the present disclosure can "comprise," "consist essentially of," or "consist of" particular ingredients, components, compositions, etc., disclosed throughout the specification.

The terms "functional film" and "film" may be used interchangeably. The term "film structure" may be used to describe a structure containing at least one "functional film" and/or "film".

According to an embodiment, the present disclosure relates to a method for improving prescription optics of semi-finished lenses made by casting or injection molding.

According to an embodiment, the present disclosure describes an ophthalmic lens treatment method that can be used in any semi-finished lens product. For instance, the ophthalmic lens treatment method can be used during semi-finished lens annealing in order to avoid cracking of the semi-finished lens.

According to an embodiment, the present disclosure describes an ophthalmic lens treatment method that can be used in any semi-finished lens product including a functional film.

Functional films, or film structures, which may be photochromic films, can be incorporated with semi-finished lenses into ophthalmic lenses to add additional optical properties to an ophthalmic lens. However, during surfacing of a surface of the semi-finished lens, or base lens, residual stresses generated within the film structure at an opposing surface of the semi-finished lens may result in the generation of deformations at the opposing surface of the base lens.

Figure 1A:

Turning now to the Figures and, in particular, FIG. 1, adapted from U.S. Pat. No. 9,283,717, which is incorporated by reference herein in its entirety, an ophthalmic lens 20 comprises two main components: a base lens 10 and a film structure 2. As is normal in ophthalmics, the base lens 10 is obtained from a semi-finished lens 1 with two surfaces which are opposed to one another. One of these surfaces, a so-called first optical surface, is created directly with a final shape during manufacturing of the semi-finished lens 1. Thus, this surface initially has curvature values which are compatible with final optical features of the ophthalmic lens 20 to be produced from the semi-finished lens 1. For example, the first optical surface may be a front convex surface S1 of the base lens 10 in the final ophthalmic lens 20, and the front convex surface S1 can be determined by the shape of the mold used for casting the semi-finished lens 1. It may be a complex surface, with mean sphere and cylinder values varying from one point to another within the front convex surface S1. For example, the curvature of the front convex surface S1, or first optical surface, at a reference point may correspond to a base value of between 1.5 and 4 diopters. The other surface of the semi-finished lens 1, which is denoted SO, is temporary and intended to be surfaced later according to an ophthalmic prescription of a lens wearer. A second optical surface S2 is created in this way from the temporary surface SO by a surfacing step, which may include traditional machining and/or digital surfacing. In the resulting ophthalmic lens, the first optical surface S1 and the second optical surface S2 cooperate for producing a desired optical power distribution together with a prescription astigmatism value. Digital surfacing includes the use of patient specific models allowing the second optical surface S2 of the base lens to be machined to the specific optical demands of the patient. To this end, during the surfacing step, a lens thickness is reduced by removing material from the semi-finished lens 1, starting from the temporary surface SO and continuing until the second optical surface S2 is created. For example, the thickness of the semi-finished lens 1 near an optical center of the first optical surface S1 may be between 6 mm and 12 mm, whereas the thickness of the base lens 10 at the same measurement point may be between 1.2 mm and 3 mm. Such a second optical surface S2 reflects personal measurements and physiological data and may be prepared for a wide array of frames.

The material of the semi-finished lens 1 may be any one used in ophthalmics. For instance, the material of the semi-finished lens 1 may be polycarbonate (PC), polymethyl methacrylate (PMMA), polystyrene, polystyrene maleic anhydride, polyamide, thermoplastic urethane, thermoset polyurethane, polyester, copolyesters, polysulfone, cyclic olefin copolymers (OCO), polyphenyl oxide, allyl diglycol carbonate, polythiourethane, episulfur polymers, epoxy, poly(meth)acrylates, polythiomethacrylates, or combinations thereof. In particular, the invention may be implemented with a lens material which has a low softening temperature or glass transition temperature. In preferred implementations of the invention, this softening temperature and/or glass-transition temperature of the semi-finished lens 1 comprising material may be between 60° C. and 90° C. For example, the comprising material of the semi-finished lens 1 may be a thermosetting plastic episulfide, with light-refracting index of between 1.70 and 1.76. Alternatively, it may also be a thermosetting plastic polythiourethane with light-refracting index of between 1.60 and 1.67.

As described above, the film structure 2 may be of a single-layer or a multilayer structure. For example, in a single-layer film structure 2, it may comprise a triacetyl cellulose (TAC) layer. Then, a softening temperature of the film structure 2 comprising the TAC layer may be higher than or equal to 120° C. In another example, the film structure 2 may be a multilayer structure. In this way, the ophthalmic lens 20 may be provided with light-polarizing function. To this end, the film structure 2 may comprise a first TAC layer, a second TAC layer, and a light-polarizing polyvinyl alcohol (PVA) layer therebetween. The light-polarizing PVA layer can be laminated between the TAC layers, such that the TAC layers provide structure to the relatively soft PVA layer and act as protecting layers on both sides of the PVA layer. Such film structure is represented in FIGS. 1B and 1*s* described in, for example, International Patent Publication No. WO2011075112A1, which is incorporated by reference herein in its entirety.

Figure 1B:
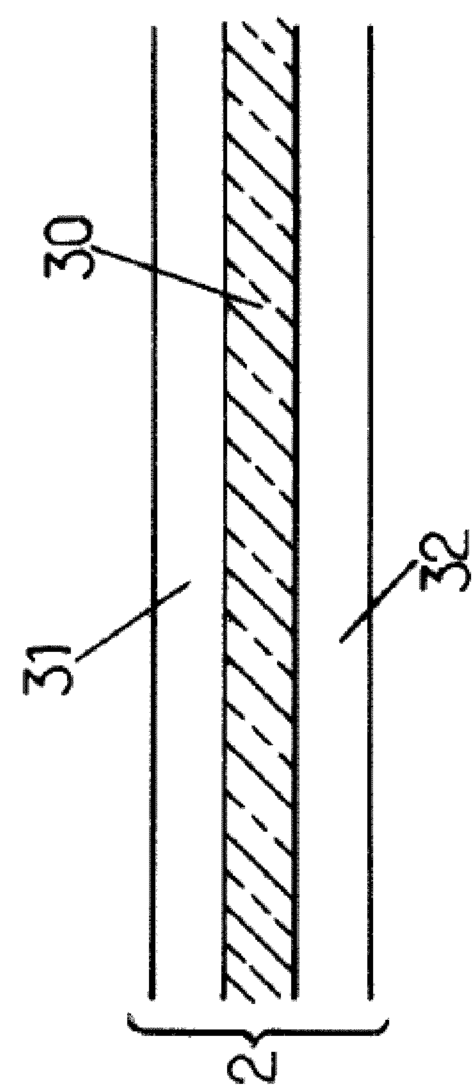
FIG. 1B is a cross-sectional view of a film structure.

With respect to the FIG. 1B, reference numbers 30, 31 and 32 respectively denote the light-polarizing PVA layer, the first TAC layer, and the second TAC layer. The thickness of the light-polarizing PVA layer 30 may be approximately 40 μm and each of the first TAC layer 31 and the second TAC layer 32 may be approximately 80 μm.

In an embodiment, the film structure 2 may have been pre-formed to a curved shape compatible with that of the first optical surface S1 of the semi-finished lens 1. However, it may also be true that the film structure 2 may have two parallel surfaces immediately following preparation thereof.

According to an embodiment, and with reference again to FIG. 1A, the film structure 2 may be retained on the first optical surface S1 of the semi-finished lens 1 using, in an example, layered connecting means. These connecting means are represented schematically by a layer 3 in FIG. 1, but they may actually have several embodiments depending on their implementation. In particular, the layered connecting means may comprise at least one latex adhesive layer, possibly combined with a hot-melt adhesive layer. Alternatively, the layered connecting means may be an adhesive or primer layer is for better adhesion between the first optical surface S1 of the semi-finished lens 1 and the film structure 2. A possible structure for the connecting means 3 includes two latex adhesive layers which are initially deposited on the first optical surface S1 and on an apposing surface of the film structure 2, respectively. Then, the first optical surface S1 and the apposing surface of the film structure 2 may be pressed against each other for assembling the semi-finished lens 1 with the film structure 2. It can be appreciated, however, that the connecting means 3 of FIG. 1A are discretionary and the first optical surface S1 and the film structure 2 may be retained together without the use of such connecting means. Assuming the above-described connecting means 3 are employed, the sequentially-arranged downward facing arrows of FIG. 1A, indicate the direction of arrangement of the semi-finished lens 1 and the film structure 2 via the connecting means 3. The above described semi-finished lens 1 and film structure 2 may be assembled by one of several processes that are understood by one of ordinary skill in the art.

Regardless of assembly method, however, it can be appreciated that residual internal stresses within the film structure 2 of the semi-finished lens 1 remain. Accordingly, subsequent surfacing of the temporary surface SO of the semi-finished lens 1 may result in optical defects at, for instance, the first optical surface S1 of the semi-finished lens 1 as energy from the residual internal stresses is distributed. Such optical defects, including surface deformations, impact visual acuity and must be addressed by way of addressing the residual internal stresses of the film structure in order to allow surfacing that achieves the second optical surface S2 of the semi-finished lens 1 and appropriate prescription ophthalmic lenses.

Accordingly, the present disclosure provides methods for ophthalmic lens treatment that include moisturized annealing in an effort to improve prescription optics of semi-finished lenses incorporating substantially thick film structures. The film structure may be, for instance, a light-polarizing film structure.

As background, annealing is a process of heating a material for a period of time before allowing it to cool. Such heating allows a structure of the material to reorganize in order to relieve internal stresses and create a material that is more ductile and malleable than before treatment. As applied to plastics, annealing includes heating a plastic beyond a predetermined temperature at which a structure of the plastic changes to become more uniform. The predetermined temperature may be referred to as a recrystallization temperature, a softening temperature, a glass transition temperature, or an annealing temperature, among others, according to the type of material used. Following softening and reorganization of the structure of the plastic, which relieves internal stresses of the plastic, the plastic can be cooled at a controlled rate in order to allow an intended result to be reliably achieved.

As suggested, such heating of the plastic allows for the reduction of residual internal stresses like those that may arise during assembly of the film structure and the first optical surface of the semi-finished lens of the present disclosure. Annealing alone, however, can be insufficient for adequately relieving residual internal stresses within the film structure that result in deformations at, for instance, the first optical surface of the semi-finished lens. Accordingly, and as in the present disclosure, heating the ophthalmic lens, prior to surfacing of the semi-finished lens, beyond a softening temperature of the film structure in the presence of moisture provides improved stress relief within the film structure and reduced optical defects in the base lens. Examples of this stress relief will be discussed at the end of the present disclosure.

Moisturized annealing as a method of ophthalmic lens treatment will now be described with reference to FIG. 2A and FIG. 2B.

Figure 2A:
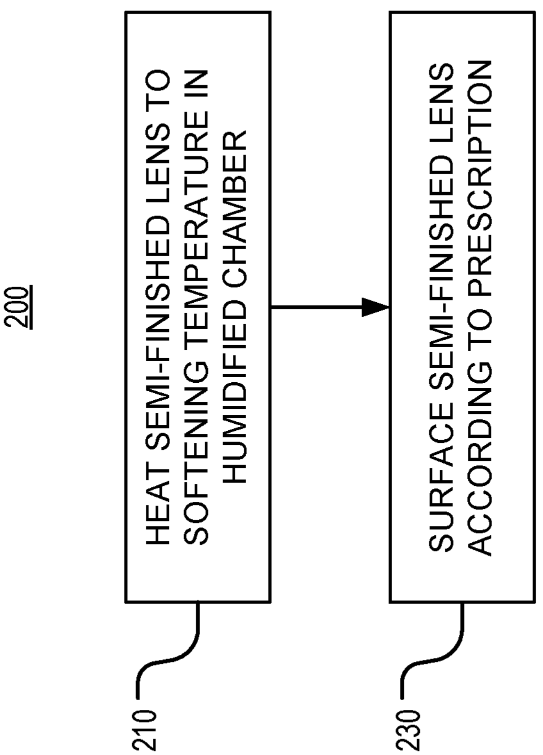
FIG. 2A is a flow diagram of a method of ophthalmic lens treatment, according to an exemplary embodiment of the present disclosure.

According to an embodiment, and with reference to FIG. 2A, ophthalmic lens treatment method 200 may be achieved by, first at step 210 of method 200, heating a semi-finished lens beyond a softening temperature of a film structure of the semi-finished lens, wherein the semi-finished lens includes a base lens and the film structure. The heating may occur in a humidified chamber. The film structure may be as described above. Second, at step 230 of method 200, the base lens of the annealed semi-finished lens may be surfaced according to an optical prescription of a wearer. In an embodiment, the optical prescription of the wearer requires surfacing the base lens to a high power, resulting in a thin and lightweight ophthalmic lens.

In an embodiment, the semi-finished lens may contain a multi-layer film structure, or laminate, including a first TAC layer, a PVA layer, and a second TAC layer, arranged in that order.

According to an embodiment, the film structure may be a single-layer film structure comprising a photochromic dye, a blue light cut dye, a UV cut dye, an IR cut dye, or any other functional constituent. Accordingly, the functional layer may provide light-polarization, color, ultraviolet protection, and the like.

According to an embodiment, the film structure may be a multi-layer film structure including at least one layer comprising a photochromic dye, a blue light cut dye, a UV cut dye, an IR cut dye, or any other functional constituent. Accordingly, the functional layer may provide light-polarization, color, ultraviolet protection, and the like.

According to an embodiment, at least one layer of the multi-layer film structure may be comprised of PC, PMMA, TAC, OCO, polyethylene terephthalate, polyamide, allyl diglycol carbonate, thio-urethane copolymer, poly-acrylate, poly-episulfide, polyepoxy, polyamide, or combinations thereof.

According to an embodiment, the heating at step 210 of method 200 may occur to a temperature of greater than 70° C. In an example, the heating at step 210 of method 200 may occur to a temperature of greater than 80° C. In an example, the heating at step 210 of method 200 may occur to a temperature of between 80° C. and 120° C. In an example, the heating at step 210 of method 200 may occur to a temperature of between 80° C. and 99° C.

According to an embodiment, the heating at step 210 of method 200 may occur in a humidified oven. In an embodiment, the humidified oven may be humidified to between 30% and 99%. In an example, the humidified oven may be humidified to between 50% and 90%. The humidification may be provided by suspension of liquid particles in air. The liquid particles may be, in an example, water.

According to an embodiment, the heating at step 210 of method 200 may occur in the humidified oven for at least 3 hours. In an embodiment, the heating may occur in the humidified oven for at least 12 hours.

According to an embodiment, the film structure, or laminate, of the semi-finished lens may have a predetermined thickness of between 200 μm and 800 μm. In an embodiment, the film structure, or laminate, of the semi-finished lens may have a predetermined thickness of between 400 μm and 800 μm.

According to an embodiment, the film structure may include optical microstructures such as microgrooves, microprisms, microlenses, Fresnel structures, diffractive structures, and the like. The optical microstructures may be disposed on a surface of the film structure and may be between 0.001 μm and 100 μm in height.

Figure 2B:
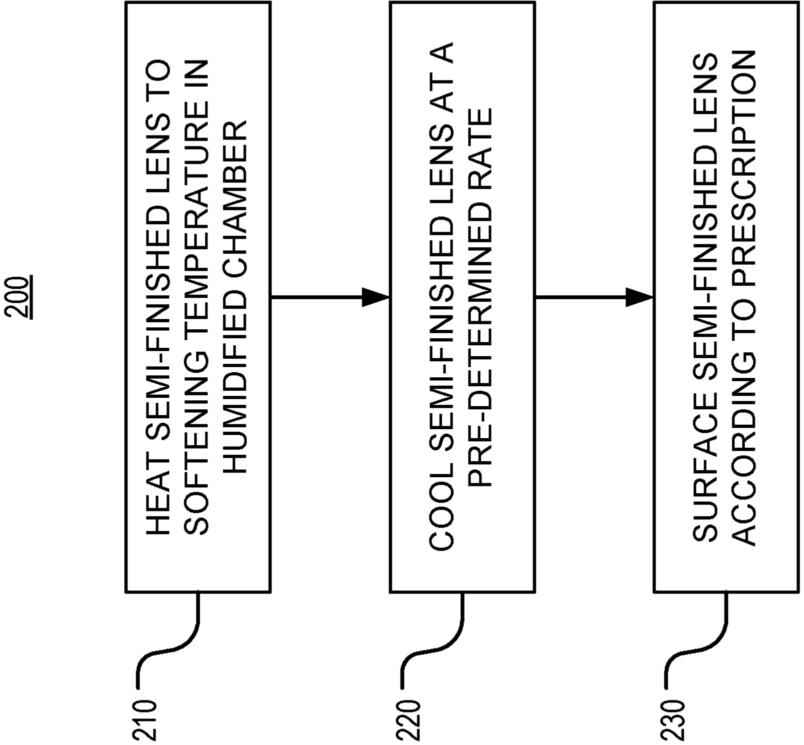
FIG. 2B is a flow diagram of a method of ophthalmic lens treatment, according to an exemplary embodiment of the present disclosure.

According to an embodiment, and with reference to FIG. 2B, ophthalmic lens treatment method 200 may be achieved by, first at step 210 of method 200, heating a semi-finished lens beyond a softening temperature of a film structure of the semi-finished lens, wherein the semi-finished lens includes a base lens and the film structure. The heating may occur in a humidified chamber. The film structure may be as described above. Second, at step 220 of method 200, the heated semi-finished lens may be allowed to cool at a controlled rate. Third, at step 230 of method 200, the base lens of the annealed semi-finished lens may be surfaced according to an optical prescription of a wearer. In an embodiment, the optical prescription of the wearer requires surfacing the base lens to a high power, resulting in a thin and lightweight ophthalmic lens.

In an embodiment, the semi-finished lens may contain a film structure, or laminate, including a first TAC layer, a PVA layer, and a second TAC layer, arranged in that order.

According to an embodiment, the film structure may be a single-layer film structure comprising a photochromic dye, a blue light cut dye, a UV cut dye, an IR cut dye, or any other functional constituent. Accordingly, the functional layer may provide light-polarization, color, ultraviolet protection, and the like.

According to an embodiment, the film structure may be a multi-layer film structure including at least one layer comprising a photochromic dye, a blue light cut dye, a UV cut dye, an IR cut dye, or any other functional constituent. Accordingly, the functional layer may provide light-polarization, color, ultraviolet protection, and the like.

According to an embodiment, at least one layer of the multi-layer film structure may be comprised of PC, PMMA, TAC, OCO, polyethylene terephthalate, polyamide, allyl diglycol carbonate, thio-urethane copolymer, poly-acrylate, poly-episulfide, polyepoxy, polyamide, or combinations thereof.

According to an embodiment, the heating at step 210 of method 200 may occur to a temperature of greater than 70° C. In an example, the heating at step 210 of method 200 may occur to a temperature of greater than 80° C. In an example, the heating at step 210 of method 200 may occur to a temperature of between 80° C. and 120° C. In an example, the heating at step 210 of method 200 may occur to a temperature of between 80° C. and 99° C.

According to an embodiment, the heating at step 210 of method 200 may occur in a humidified oven. In an embodiment, the humidified oven may be humidified to between 30% and 99%. In an example, the humidified oven may be humidified to between 50% and 90%. The humidification may be provided by suspension of liquid particles in air. The liquid particles may be, in an example, water.

According to an embodiment, the heating at step 210 of method 200 may occur in the humidified oven for at least 3 hours. In an embodiment, the heating may occur in the humidified oven for at least 12 hours.

According to an embodiment, the film structure, or laminate, of the semi-finished lens may have a predetermined thickness of between 200 μm and 800 μm. In an embodiment, the film structure, or laminate, of the semi-finished lens may have a predetermined thickness of between 400 μm and 800 μm.

According to an embodiment, the film structure may include optical microstructures such as microgrooves, microprisms, microlenses, Fresnel structures, diffractive structures, and the like. The optical microstructures may be disposed on a surface of the film structure and may be between 0.001 μm and 100 μm in height.

Figure 3A:
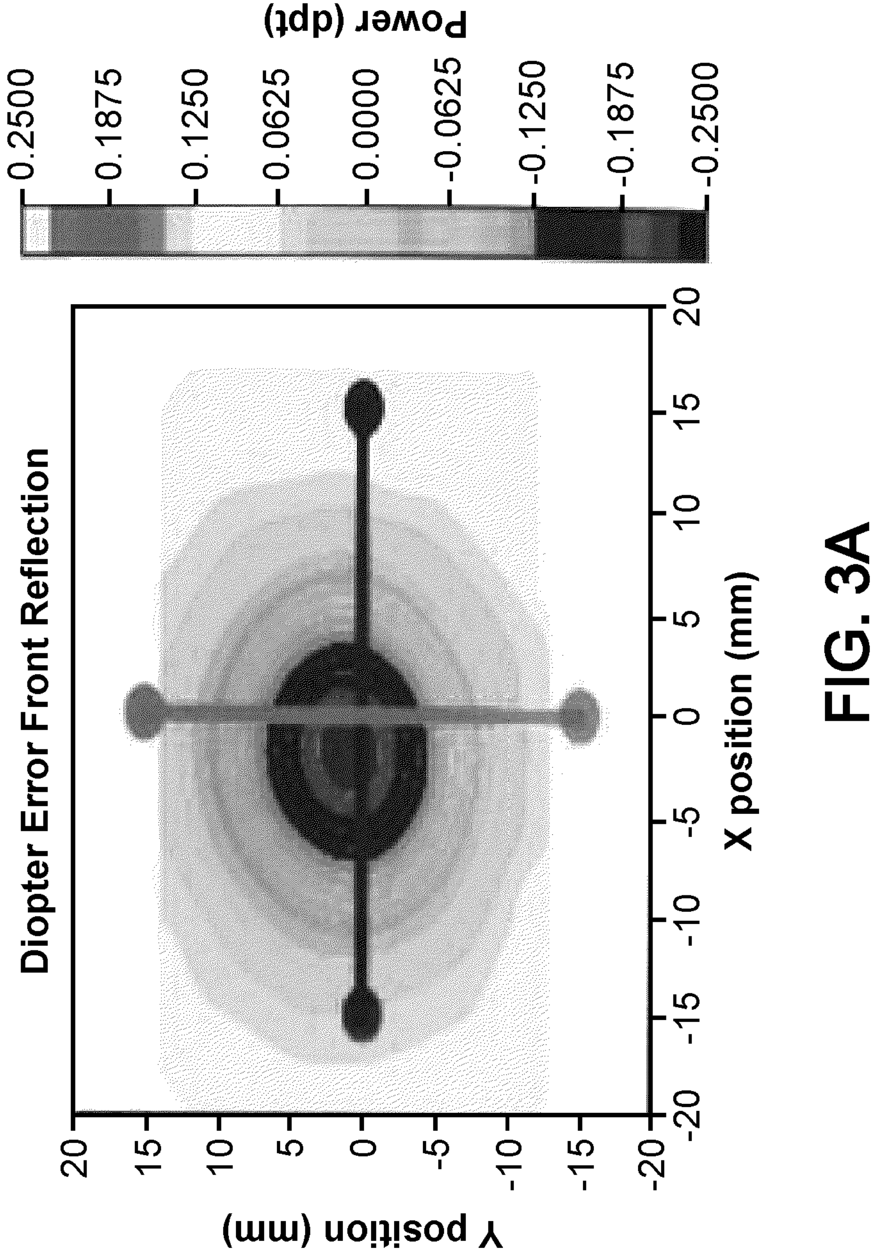
FIG. 3A is an illustration of surface deformation level of an ophthalmic lens, according to an exemplary embodiment of the present disclosure.
Figure 3B:
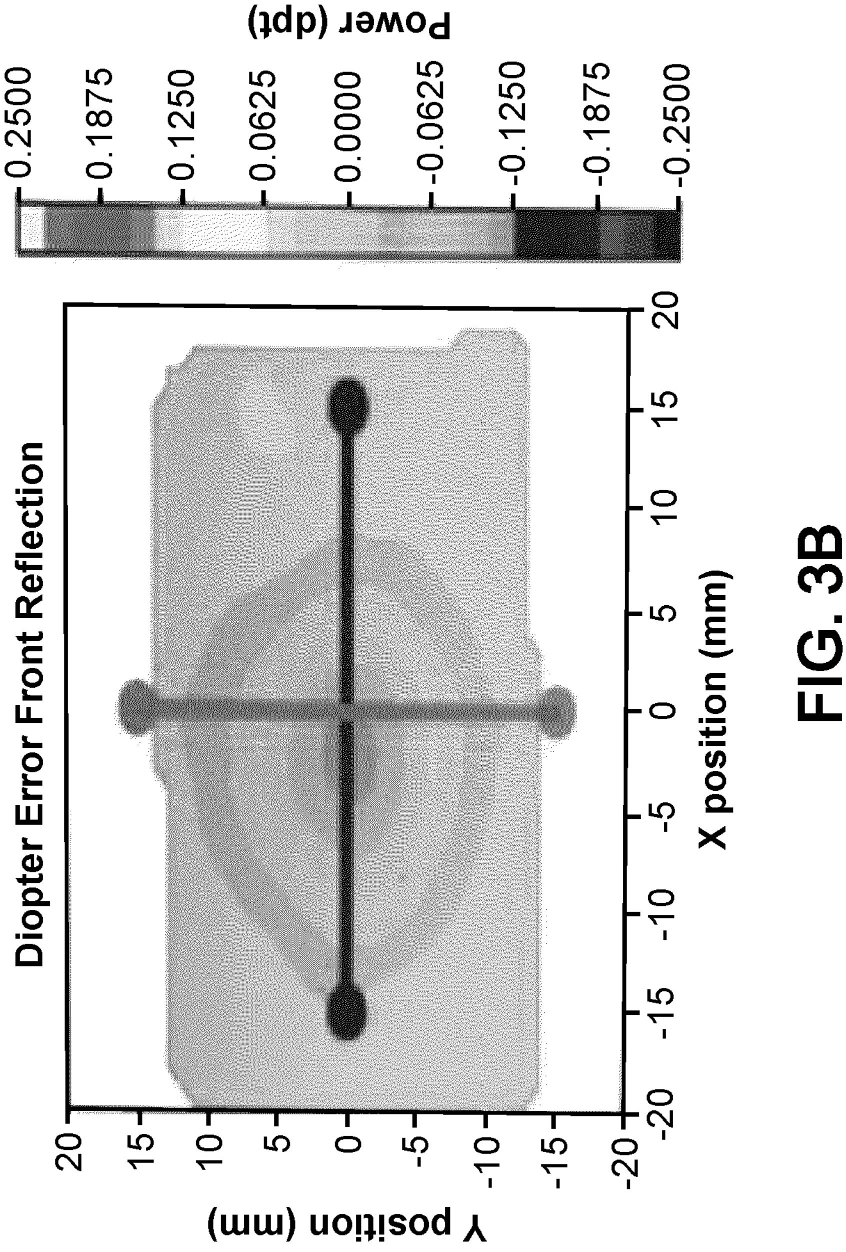
FIG. 3B is an illustration of surface deformation level of an ophthalmic lens, according to an exemplary embodiment of the present disclosure.

The methods of FIG. 2A and FIG. 2B can be better appreciated with reference to FIG. 3A and FIG. 3B, illustrations of surface deformation as determined by dual lens mapping (DLM). For each of FIG. 3A and FIG. 3B, the x-axis reflects an x-position relative to a center of a surfaced ophthalmic lens, the y-axis reflects a y-position relative to the center of the surfaced ophthalmic lens, and the gradient hue reflects a degree of a diopter error relative to a target diopter value.

For instance, FIG. 3A provides an illustration of deformation levels of a base lens of an ophthalmic lens when a corresponding semi-finished lens is annealed in a dry oven. The corresponding semi-finished lens of FIG. 3A includes a multi-layer film structure having a TAC layer, a PVA layer, and a TAC layer, in that order, and a thickness of 400 μm. The PVA layer may provide light polarizing properties. As determined by the increased gradient hue of FIG. 3A, wherein the vertical line and horizontal line represent cross sections of the ophthalmic lens in subsequent images, annealing in the absence of humidity followed by surfacing to a high minus power (below −6D base) results in significant deformation to the surface of the base lens. An identical semi-finished lens may be separately annealed in a humidified environment. To this end, the semi-finished lens may be heated for 24 hours at a predetermined temperature >80° C. in a humidified oven humidified to >50% humidity. As described previously, the predetermined temperature may be based on a softening temperature, recrystallization temperature, and the like, of the multi-layer film structure. As shown in FIG. 3B, the semi-finished lens heated in a humidified environment exhibited less deformation as indicated by a smaller gradient hue.

In view of the above, it can be appreciated that a severe prescription center deformation of an ophthalmic lens including a 400 μm thick multi-layer film structure that has not been 'moisture annealed' could cause a visible surface curve change by reflection, and therefore such an ophthalmic lens would be rejected by standard cosmetic inspection and optical inspection. Moreover, the ophthalmic lens derived by the ophthalmic lens treatment method of the present disclosure achieves greatly reduced deformation at the prescription center of the ophthalmic lens and therefore, would be accepted by standard cosmetic inspection and optical inspection.

Furthermore, this moisturized annealing method is found not only to greatly reduce the residual internal stress of an ophthalmic lens including a thick film structure but to also reduce the risk of cracking of the semi-finished lens during annealing at high temperatures. For instance, it may occur that cracking appears in semi-finished lenses when dry heated at high temperature for an extended period of time (e.g. 24 hours). In some cases, due to the dry environment, the semi-finished lens cannot be heated to a sufficiently high temperature for a sufficient length of time to allow for annealing of the semi-finished lens. The 'moisture annealed' method of the present disclosure, however, allows semi-finished lenses to be heated at higher temperature for longer periods of time in order to exploit the benefits of annealing and achieve better optical properties and mechanical properties.

According to an embodiment, the semi-finished lens may be a plastic lens fabricated by casting or injection molding with a film structure.

According to an embodiment, the film structure of the semi-finished lens may be a polarized film structure including a polarizing PVA film and at least one protective film on opposing surfaces of the polarizing PVA film.

As part of the present disclosure, specific examples are included below. The examples are for illustrative purposes only and are not intended to limit the invention. In fact, the examples may not be exemplary embodiments of the present disclosure but instead examples intended to provide contrast between non-limiting examples of the present disclosure and other practices in the field. Those of ordinary skill in the art will readily recognize parameters that can be changed or modified to yield essentially the same results. For instance, it can be appreciated that the above- and below-defined ranges are merely exemplary ranges and that other ranges included or excluded from the above may be implemented in order to arrive at the ophthalmic lens described in the present disclosure.

Example 1

Figure 4A:
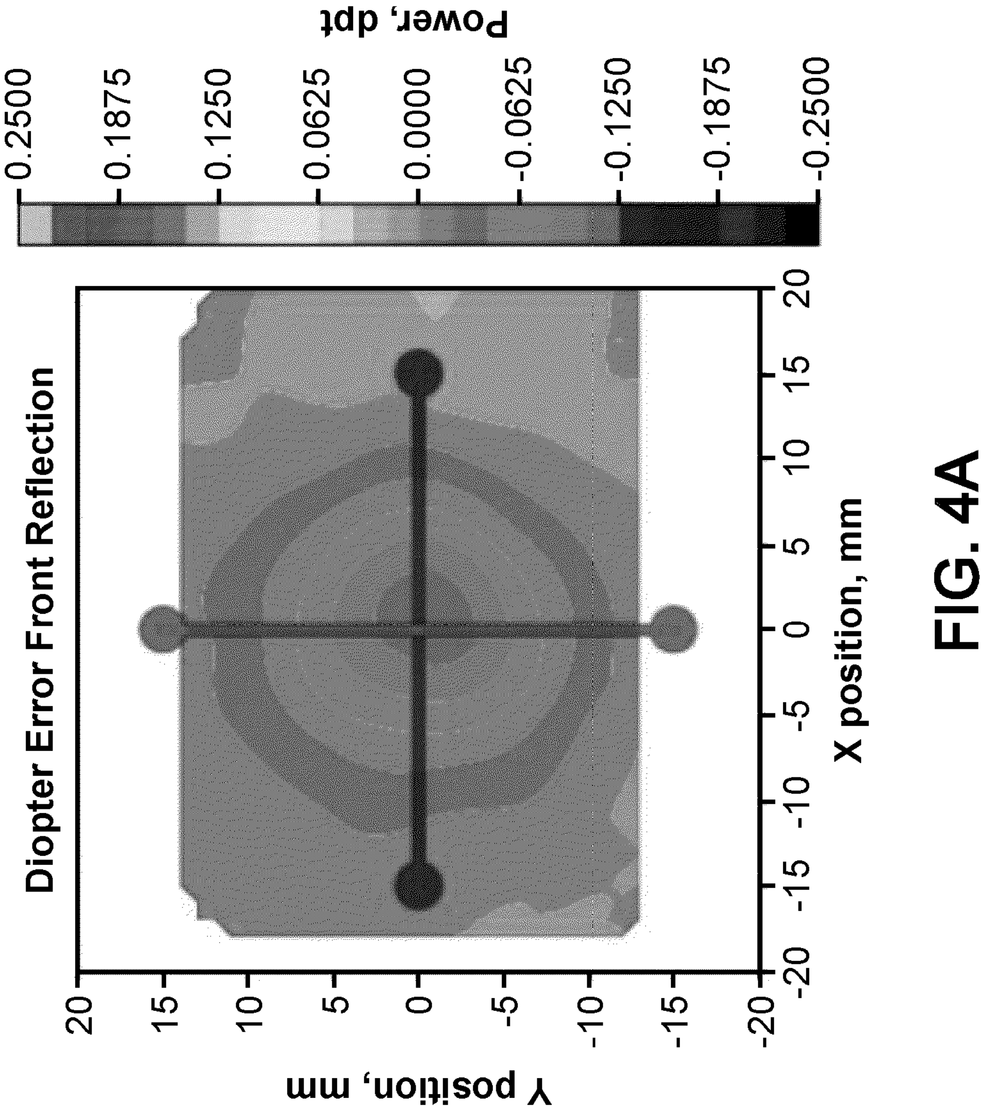
FIG. 4A is an illustration of surface deformation level of an ophthalmic lens, according to an exemplary embodiment of the present disclosure.
Figure 4B:
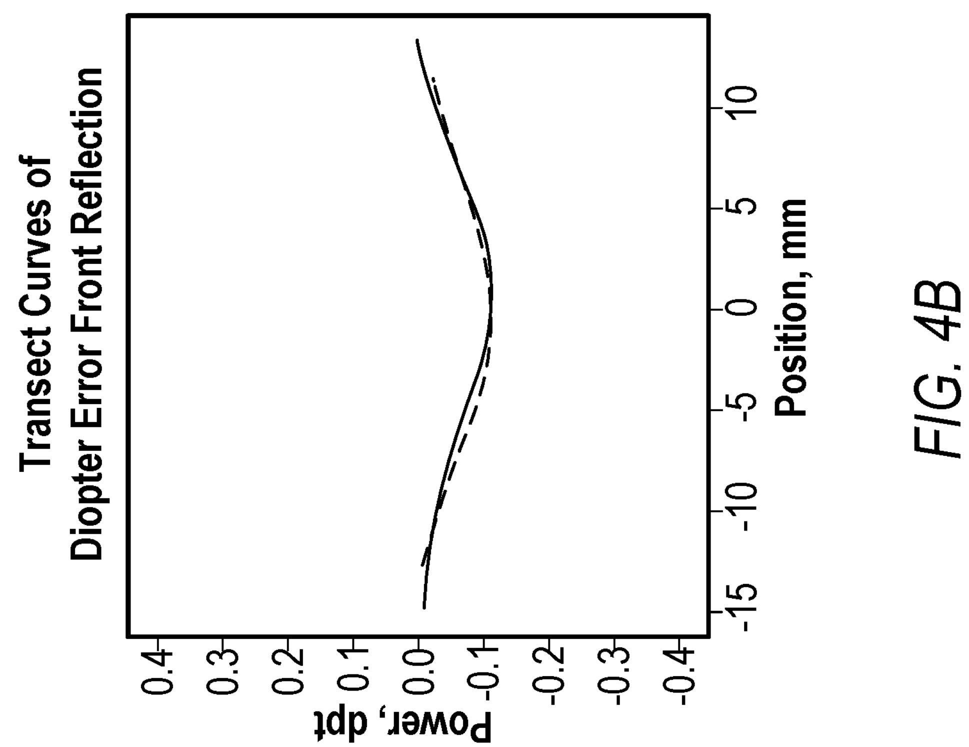
FIG. 4B is an illustration of surface deformation level of an ophthalmic lens, according to an exemplary embodiment of the present disclosure.

A 400 μm TAC film structure (Onbitt) was thermoformed by LEMA to a 2D base and then cast with CR-39 monomer (e.g. base lens) to a 2D base semi-finished polar lens. The semi-finished polar lens was then heated for 24 hours in an oven at a temperature of 90° C. and humidity of 70%. Following cooling, the resulting annealed semi-finished lens was then digitally surfaced to −12.0D sphere power with a center thickness of 1.30 mm. The surfaced ophthalmic lens was then measured by DLM to evaluate the front curve and center deformation level. The surfaced ophthalmic lens demonstrated good optics by DLM and with little center deformation, as illustrated in FIG. 4A and FIG. 4B. For each of FIG. 4A and FIG. 4B, the x-axis reflects an x-position relative to a center of a surfaced ophthalmic lens and the y-axis reflects a y-position relative to the center of the surfaced ophthalmic lens. Regarding FIG. 4A, the gradient hue reflects a degree of a diopter error relative to a target diopter value. Curves corresponding to the vertical line and the horizontal line of FIG. 4A are graphed in FIG. 4B as a dashed line and a solid line, respectively, to demonstrate uniformity of the lens surface area. As can be appreciated from FIG. 4A and FIG. 4B, the diopter change around the lens center area after surfacing is within 0.10 Diopter, leading to good optics across the entire lens surface.

Comparative Example 1

Figure 5B:
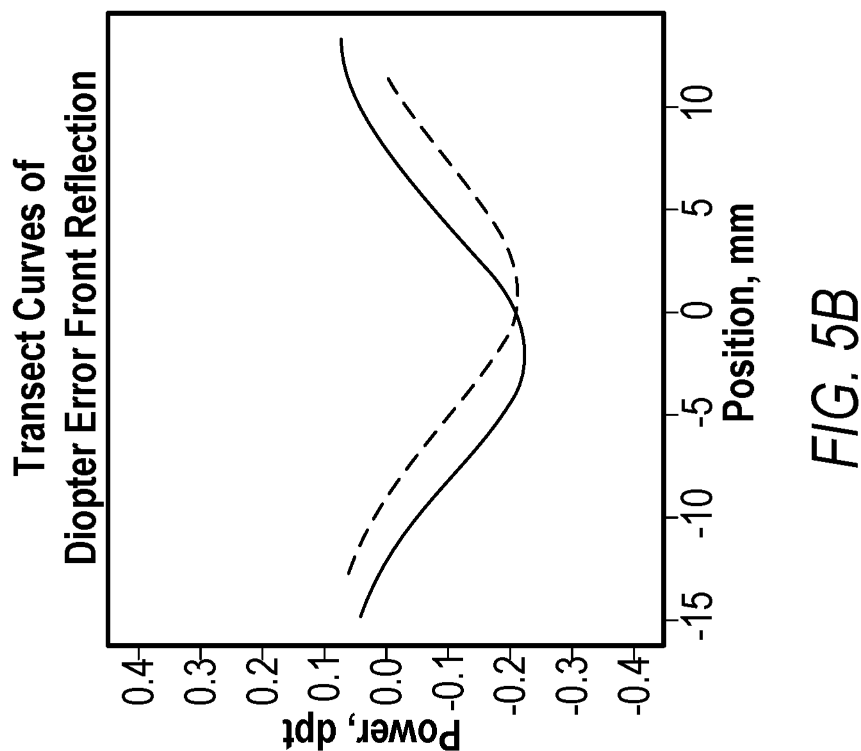
FIG. 5B is an illustration of surface deformation level of an ophthalmic lens, according to an exemplary embodiment of the present disclosure.
Figure 5A:
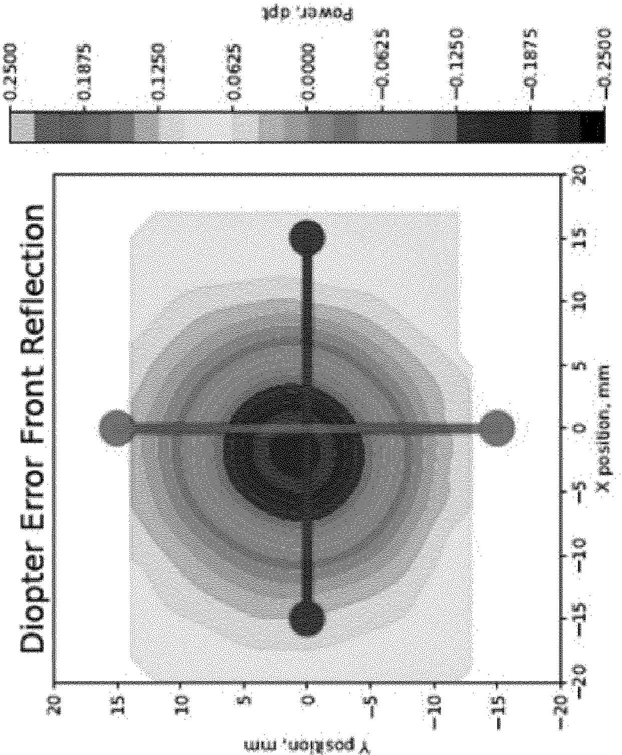
FIG. 5A is an illustration of surface deformation level of an ophthalmic lens, according to an exemplary embodiment of the present disclosure.

A 400 μm TAC film structure (Onbitt) was thermoformed by LEMA to a 2D base and then cast with CR-39 monomer (e.g. base lens) to a 2D base semi-finished polar lens. The semi-finished polar lens was then heated for 24 hours in an oven at a temperature of 90° C. and at 0% humidity (e.g. dry annealing). Following cooling, the resulting annealed semi-finished lens was then digitally surfaced to −12.0D sphere power with a center thickness of 1.30 mm. The surfaced ophthalmic lens was then measured by DLM to evaluate the front curve and center deformation level. The surfaced ophthalmic lens demonstrated poor optics by DLM and with significant center deformation, as illustrated in FIG. 5A and FIG. 5B. For each of FIG. 5A and FIG. 5B, the x-axis reflects an x-position relative to a center of a surfaced ophthalmic lens and the y-axis reflects a y-position relative to the center of the surfaced ophthalmic lens. Regarding FIG. 5A, the gradient hue reflects a degree of a diopter error relative to a target diopter value. Curves corresponding to the vertical line and the horizontal line of FIG. 5A are graphed in FIG. 5B as a dashed line and a solid line, respectively, to demonstrate deformities of the lens surface area. As can be appreciated from FIG. 5A and FIG. 5B, the diopter change around the lens center area after surfacing is approximately 0.20 Diopter, which is not acceptable according to ANSI Z80.1 tolerance.

Example 2

Figure 6:
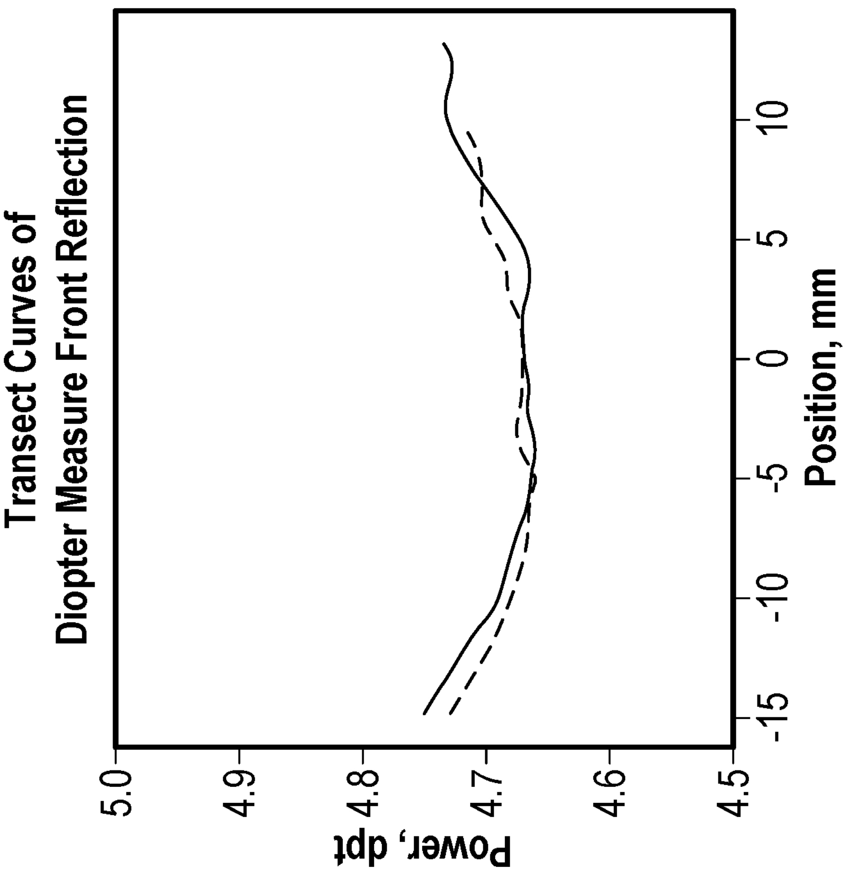
FIG. 6 is an illustration of surface deformation level of an ophthalmic lens, according to an exemplary embodiment of the present disclosure.

A 600 μm PC polar film structure (Onbitt) was thermoformed by LEMA to a 4.25D base and then injected with PC resin to a 4.25D base semi-finished polar lens. The semi-finished polar lens was then heated for 12 hours in an oven at a temperature of 90° C. and humidity of 70%. After cooling, the annealed semi-finished lens was digitally surfaced to sphere 0.00D and cylinder of −2.00D power with a center thickness of 1.30 mm. The surfaced ophthalmic lens was then measured by DLM to evaluate the front curve and center deformation level. The surface ophthalmic lens demonstrated very good optics (Δ≤0.10D) by DLM, as shown in FIG. 6, wherein center curve changes are decreased when compared with dry annealed ophthalmic lenses. For FIG. 6, the x-axis reflects a position relative to a center of a surfaced ophthalmic lens and the y-axis indicates a power of the lens, the dashed line and solid line reflecting cross-sectional curvatures in the y-direction and the x-direction respectively.

Comparative Example 2

A 400 μm TAC film structure (Onbitt) was thermoformed by LEMA to a 2D base and then cast with CR-39 monomer (e.g. base lens) to a 2D base semi-finished polar lens. The semi-finished polar lens was then heated for 6 hours in an oven at a temperature of 100° C. and at 0% humidity (e.g. dry annealing). Following cooling, the resulting annealed semi-finished lens was then digitally surfaced to −12.0D sphere power with a center thickness of 1.30 mm. The surfaced ophthalmic lens was then measured by DLM to evaluate the front curve and center deformation level. The surfaced ophthalmic lens demonstrated poor optics by DLM and with significant center deformation. In addition to high center deformation, lens edge cracking was observed as a result of heating to a high temperature for a long time period.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) An ophthalmic lens treatment method, comprising heating, in a humidified environment, a semi-finished lens to a predetermined temperature, the semi-finished lens containing a base lens and a film structure of a predetermined thickness, and surfacing the semi-finished lens to a predetermined power, wherein the predetermined temperature is a temperature above a softening temperature of the film structure.

(2) The method according to (1), wherein the humidified heating heats the semi-finished lens for a predetermined time period of at least 3 hours.

(3) The method according to either (1) or (2), wherein the humidified heating heats the semi-finished lens to, as the predetermined temperature, a temperature between 70° C. and 120° C.

(4) The method according to any one of (1) to (3), wherein the humidified heating heats the semi-finished lens to, as the predetermined temperature, between 80° C. and 99° C.

(5) The method according to any one of (1) to (4), wherein the humidity of the humidified environment is between 30% and 99%.

(6) The method according to any one of (1) to (5), wherein the humidity of the humidified environment is between 50% and 90%.

(7) The method according to any one of (1) to (6), wherein the predetermined thickness of the film structure is between 200 μm and 800 μm.

(8) The method according to any one of (1) to (7), wherein the film structure includes optical microstructures of between 0.001 μm and 100 μm.

(9) The method according to any one of (1) to (8), wherein the optical microstructures include Fresnel structures or diffractive structures.

(10) An ophthalmic lens, comprising an annealed semi-finished lens including a base lens and a film structure having a predetermined thickness of at least 200 μm, the annealed semi-finished lens being annealed in a humidified environment at a predetermined temperature above a softening temperature of the film structure, wherein the annealed semi-finished lens is surfaced to a predetermined power.

(11) The semi-finished lens according to (10), wherein the annealed semi-finished lens is annealed for a predetermined time period of at least 3 hours.

(12) The semi-finished lens according to either (10) or (11), wherein the annealed semi-finished lens is annealed at, as the predetermined temperature, a temperature between 70° C. and 120° C.

(13) The semi-finished lens according to any one of (10) to (12), wherein the humidified environment has a humidity of between 30% and 99%.

(14) The semi-finished lens according to any one of (10) to (13), wherein the base lens is at least one of a material selected from the group consisting of polycarbonate, polymethyl methacrylate, polyamide, polyester, cellulose acetate butyrate, and triacetyl cellulose.

(15) The semi-finished lens according to any one of (10) to (14), wherein the base lens or the film structure has properties including at least one selected from the group consisting of an ultraviolet cut filter, a blue light cut filter, an infrared cut filter, a selective wavelength cut dye, a color enhancement dye, a light filter dye, a light polarization filter dye, photochromic properties, and electrochromic properties.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An ophthalmic lens treatment method, comprising:

heating, in a humidified environment, a semi-finished lens to a predetermined temperature, the semi-finished lens containing a base lens and a film structure of a predetermined thickness; and surfacing the semi-finished lens to a predetermined power to form the ophthalmic lens, wherein the predetermined temperature is a temperature between 70° C. and 120° C., and a humidity of the humidified environment is between 30% and 99%.

2. The method according to claim 1, wherein the humidified heating heats the semi-finished lens for a predetermined time period of at least 3 hours.

3. The method according to claim 1, wherein the humidified heating heats the semi-finished lens to, as the predetermined temperature, between 80° C. and 99° C.

4. The method according to claim 1, wherein the humidity of the humidified environment is between 50% and 90%.

5. The method according to claim 1, wherein the predetermined thickness of the film structure is between 200 μm and 800 μm.

6. The method according to claim 1, wherein the film structure includes optical microstructures of between 0.001 μm and 100 μm.

7. The method according to claim 6, wherein the optical microstructures include Fresnel structures or diffractive structures.

8. An ophthalmic lens, comprising:

an annealed semi-finished lens including a base lens and a film structure having a predetermined thickness of between 400 μm and 800 μm, the annealed semi-finished lens being annealed in a humidified environment at a predetermined temperature between 70° C. and 120° C., wherein the annealed semi-finished lens is surfaced to a predetermined power to form the ophthalmic lens, and wherein the humidified environment has a humidity of between 30% and 99%.

9. The ophthalmic lens according to claim 8, wherein the annealed semi-finished lens is annealed for a predetermined time period of at least 3 hours.

10. The ophthalmic lens according to claim 8, wherein the base lens is at least one of a material selected from the group consisting of polycarbonate, polymethyl methacrylate, polyamide, polyester, cellulose acetate butyrate, and triacetyl cellulose.

11. The ophthalmic lens according to claim 8, wherein the base lens or the film structure has properties including at least one selected from the group consisting of an ultraviolet cut filter, a blue light cut filter, an infrared cut filter, a selective wavelength cut dye, a color enhancement dye, a light filter dye, a light polarization filter dye, photochromic properties, and electrochromic properties.

12. The ophthalmic lens according to claim 8, wherein the film structure comprises microlenses.

13. The ophthalmic lens according to claim 8, wherein the predetermined power is of below −6D.

14. The method according to claim 1, wherein the film structure comprises microlenses.

15. The method according to claim 1, wherein the predetermined power is of below −6D.

* * * * *